May 22, 1956 F. BAXTER 2,746,402
ICE CREAM MOLD
Filed Oct. 6, 1954
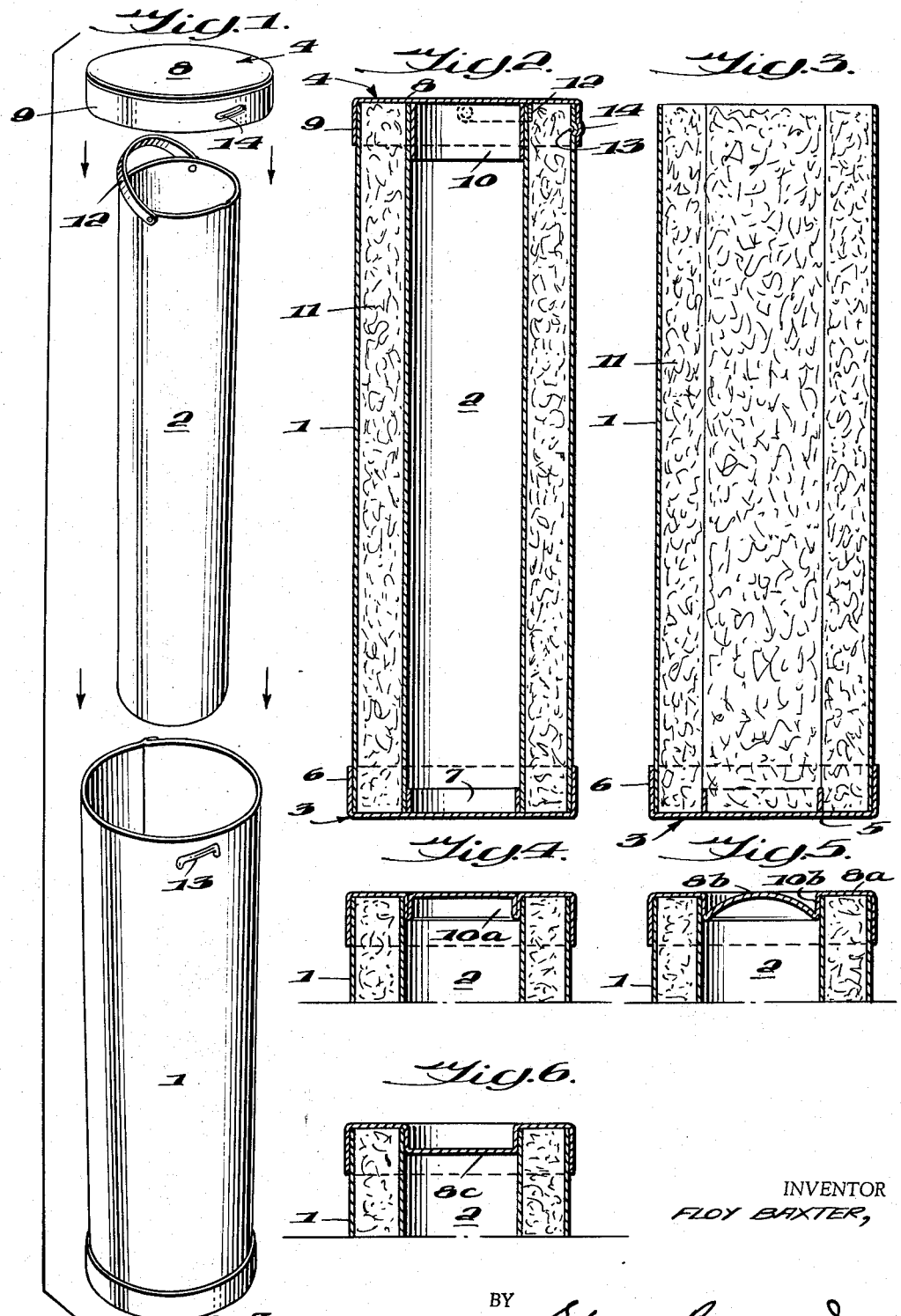
INVENTOR
FLOY BAXTER,
BY Stone, Boyden & Mack
ATTORNEYS

United States Patent Office 2,746,402
Patented May 22, 1956

2,746,402

ICE CREAM MOLD

Floy Baxter, Fort Lauderdale, Fla.

Application October 6, 1954, Serial No. 460,684

4 Claims. (Cl. 107—19)

This invention relates to ice cream molds and particularly to an improved mold for making composite or multi-colored ice cream bars.

The invention provides a novel ice cream mold of the type referred to, which is particularly adapted for use by the housewife in making ice cream bars having concentric arrangements of flavors and colors in home quick freeze units or in the frozen food storage units of domestic refrigerators. The mold is of the type comprising a plurality of concentrically disposed tubular molding members. In use, the space between the outermost two of these tubular molding members is filled with ice cream of one type or color, the ice cream is caused to congeal, the inner mold member is withdrawn, and the interior space defined by the congealed ice cream is then filled with ice cream of a different type or color, which is in turn caused to congeal.

My improved mold is characterized by provision of at least two tubular mold members of substantially different diameters and associated end closures so constructed that the mold members may be more readily assembled to receive the initial quantity of ice cream mix, and that the inner mold member, or members, may be more readily withdrawn after the initial charge of ice cream has been congealed.

In order that the invention may be understood in detail, reference is had to the accompanying drawings which form a part of this specification, and wherein Fig. 1 is an exploded perspective view of an ice cream mold constructed in accordance with one embodiment of the invention;

Fig. 2 is a vertical sectional view of the mold of Fig. 1 showing the mold fully assembled and with the outmost mold chamber filled with ice cream;

Fig. 3 is a vertical sectional view similar to Fig. 2 but with one end closure and the inner mold member removed; and Figs. 4–6 are fragmentary vertical sectional views illustrating modified end closures constructed in accordance with the invention.

Referring now to the drawings in detail, and first to Figs. 1–3 thereof, it will be seen that the embodiment of the invention here illustrated comprises an outer cylindrical casing member 1 in the form of an open-ended tube, a similar inner forming member 2 of smaller diameter than the outer member 1, and a pair of end closures 3 and 4 constructed to close the ends of members 1 and 2 and support said members in concentrically disposed relation. It will be noted that the members 1 and 2 are of substantially equal length and provide substantially uninterrupted plane cylindrical molding surfaces extending continuously between the two end closures.

The end closure 3, which may be termed the bottom of the assembled device, includes a circular end plate 5 having an outer annular flange 6 of such diameter as to closely embrace one end of the casing member 1 in friction-fit relation, as seen in Figs. 2 and 3. The closure 3 is also provided with an inner annular flange 7 of such diameter as to fit snugly within one end of the forming member 2, as seen in Fig. 2.

At the opposite end of the assembly, the end closure 4 is provided with a circular end plate 8, having an outer annular flange 9, of such diameter as to snugly embrace the end of the casing member 1, and also an inner annular flange 10 of such diameter as to fit snugly within the end of the inner forming member 2. Thus, the members 1 and 2 are held rigidly in coaxial relation by action of the pairs of flanges 6, 7 and 9, 10, the flanges being themselves coaxially disposed on their respective end plates 5 and 8.

It will be noted that, while the outer flanges 6 and 9 are of substantially the same length, the inner flange 7 on end plate 5 is made much shorter than the outer flanges. The inner flange 10, on the other hand, is much longer than the outer flanges. Thus, when the mold is fully assembled, the inner member 2 is firmly positioned by reason of the relatively great supporting surface provided jointly by flanges 7 and 10. But, when the end closure 4 is removed, the inner forming member 2 may be easily worked free of the shorter flange 7.

To make possible ready withdrawal of the inner forming member 2 after the ice cream 11 has hardened, the member 2 is provided at the end engaged by closure 4 with a pivoted bail 12 which is semi-circular in form. As seen in Fig. 2, the ends of the bail 12 are pivoted on the member 2 by suitable studs and the radius of the bail is such that the bail may be swung to a retracted position in which it engages the surface of member 2 opposite that engaged by the flange 10. In such retracted position, the bail 12 lies with its uppermost edge flush with the corresponding end of the member 2, so that the closure 4 may be applied with plate 8 in full engagement with the end surfaces of members 1 and 2. As seen in Fig. 1, the bail 12 may be swung to an outer position in which it may be easily grasped by the user.

As seen in Figs. 1–3, the end closure 4 is preferably secured in place by means of partial threads 13 and 14 formed by a pressing operation in the members 1 and 9, respectively. Similar securing means may be provided for the end closure 3.

In use, the end closure 3 is first placed on the casing member 1. The inner forming member 2 is then inserted within the casing and seated fully on the inner flange 7 of the closure 3. The bail 12 is pivoted to retracted position. The space between member 2 and casing 1 is then filled with ice cream mix, as at 11, Fig. 2, and the end closure 4 then applied so that the flanges 9 and 10 are fully seated, as shown. The mold is then placed in the freezer until the ice cream 11 has fully congealed, after which the mold is taken out and the closure 4 is removed. The bail 12 is then raised and the member 2 worked free from the flange 7 by a twisting and pulling motion, the member 2 then being fully withdrawn, leaving a cylindrical cavity defined by the congealed ice cream 11, Fig. 3. This cavity is then filled with ice cream of a different kind or color, the closure 4 replaced, and the mold replaced in the freezer to complete the freezing operation. The mold is then again removed, held under running water for a few moments to free the casing 1 from the ice cream, and the completed composite ice cream bar removed.

Mold members 1 and 2 may be fabricated from metal, synthetic resin or other suitable material capable of providing a firm, smooth, tubular molding surface. While I have illustrated a particularly advantageous embodiment of the invention wherein the mold members 1 and 2 are of circular cross-section, it is to be understood that these tubular members, and the cooperating closure flanges 6, 7 and 9, 10, may have a non-circular cross-section. It is highly advantageous, however, to employ a cylindrical inner mold member 2 and cylindrical flange 7 in order that the member 2 may more readily be worked free from that flange by a slight rotary or twisting movement imparted by use of the bail 12.

In the embodiment of Figs. 1–3, the flanges 7 and 10 are in the form of separate cylindrical tubes secured to their respective closure plates in any suitable manner, as by welding. As seen in Figs. 4–6, these flanges may be formed integrally with the end plates 5 and 8. Thus, in Fig. 4, the flange 10$^a$ is double-walled. In Fig. 5, the end plate 8$^a$ is pressed to provide a central convex portion 8$^b$ connected to the main end plate by the flange 10$^b$. And, in Fig. 6, the construction is similar to that of Fig. 5, except that the central portion 8$^c$ is flat. It will be obvious that many such modifications may be made in the end closures, both as manufacturing expedients and to provide special configurations in the ends of the finished ice cream bar.

I claim:

1. In a mold for forming a composite confectionary product, the combination of a plurality of tubular mold members of different diameters disposed concentrically one within the other, each of said members being open ended and providing a substantially uninterrupted tubular mold surface extending continuously throughout its length, a pair of end closures each provided with an outer annular flange disengageably embracing one end of the outermost one of said mold members and an inner annular flange separably engaged with the end of another one of said mold members, said outer annular flanges extending longitudinally of the mold for a material portion of its length and one of said inner annular flanges being substantially shorter than the other, and a handle pivoted to said other one of said mold members at the end thereof opposite said shorter inner annular flange.

2. In an ice cream mold, the combination of an outer tubular casing member, an inner cylindrical forming member disposed concentrically within said casing member and extending throughout substantially the entire length thereof, a pair of end closures each including an outer annular flange embracing a different end of said casing member and an inner cylindrical flange disposed in friction-fit relation with a different end of said forming member, and a semi-circular bail pivotally connected to one end of said forming member, the radius of said bail being such that said bail may be pivoted to a retracted position against the surface of said forming member opposite that engaged by the inner annular flange of the corresponding end closure, the one of said inner annular flanges at the end of the mold opposite said bail being materially shorter than the other of said inner annular flanges, and said casing member and said forming member providing substantially unbroken plane molding surfaces extending continuously between said end closures.

3. In a mold for forming a composite confectionary product, the combination of an outer tubular casing, an inner tubular forming member, said forming member being of substantially smaller diameter than said casing and being disposed concentrically therein, and a pair of end closures each including an outer annular flange disengageably embracing one end of said casing and an inner annular flange disposed in friction-fit relation within one end of said forming member, said casing and said forming member providing substantially uninterrupted plane tubular molding surfaces extending continuously between said end closures, said outer annular flanges extending longitudinally of the mold for a material portion of its length, one of said inner annular flanges being substantially shorter than said outer flanges, and the other of said inner annular flanges being substantially longer than said outer flanges.

4. In a mold for forming a composite confectionary product, the combination of an outer tubular casing member, an inner tubular forming member, said forming member being of substantially smaller diameter than said casing member and being disposed concentrically therein to define with said casing member a continuous annular mold chamber, a bottom end closure member having an inner annular flange disposed in friction-fit relation with one end of said forming member, a top closure member having outer and inner annular flanges detachably engaging the other ends of said casing member and said inner forming member respectively, the flanges of said top closure member extending longitudinally of the mold for a material portion of the length thereof to firmly position said inner forming member during the production of a confectionary body within said mold space, and the inner flange of said bottom closure member being substantially shorter than the inner flange of said top closure member to facilitate removal of said inner forming member, at a time when said top closure member has been removed, preparatory to production of a second confectionary body within the annular confectionary body formed in said mold space.

References Cited in the file of this patent

UNITED STATES PATENTS

| 474,518 | Bishop | May 10, 1892 |
| 657,610 | Mitchell | Sept. 11, 1900 |
| 1,127,053 | MacDonald | Feb. 2, 1915 |
| 1,852,966 | Green | Apr. 5, 1932 |
| 2,123,836 | Thomas et al. | July 12, 1938 |
| 2,674,960 | Pasquale | Apr. 13, 1954 |

FOREIGN PATENTS

| 654,552 | France | Nov. 29, 1928 |